United States Patent
Pezeshki et al.

(10) Patent No.: US 12,185,147 B2
(45) Date of Patent: Dec. 31, 2024

(54) BEAM INFERENCE FOR MULTIPLE TRANSMIT RECEIVE POINT COMMUNICATIONS

(71) Applicant: QUALCOMM Incorporated, San Diego, CA (US)

(72) Inventors: Hamed Pezeshki, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/302,741

(22) Filed: May 11, 2021

(65) Prior Publication Data

US 2022/0369141 A1 Nov. 17, 2022

(51) Int. Cl.
*H04W 24/10* (2009.01)
*H04B 7/06* (2006.01)
*H04L 5/00* (2006.01)
*H04W 64/00* (2009.01)
*G06N 3/04* (2023.01)

(52) U.S. Cl.
CPC .......... *H04W 24/10* (2013.01); *H04B 7/0695* (2013.01); *H04L 5/0048* (2013.01); *H04W 64/003* (2013.01); *G06N 3/04* (2013.01)

(58) Field of Classification Search
USPC ....................................................... 370/329
See application file for complete search history.

(56) References Cited

U.S. PATENT DOCUMENTS

| 11,375,527 | B1 * | 6/2022 | Eyuboglu | .......... H04B 7/15528 |
| 2019/0306030 | A1 * | 10/2019 | Chen | .................. H04L 45/12 |
| 2021/0167821 | A1 * | 6/2021 | Chen | .................... H04B 7/0408 |
| 2022/0151019 | A1 * | 5/2022 | Balasubramanian | ........ H04W 76/34 |
| 2022/0279560 | A1 * | 9/2022 | Uzeda Garcia | ... H04W 72/1284 |

FOREIGN PATENT DOCUMENTS

| WO | WO-2020214168 A1 * | 10/2020 | .......... H04B 7/0408 |
| WO | WO-2022155244 A2 * | 7/2022 | |

* cited by examiner

*Primary Examiner* — Jeffrey M Rutkowski
*Assistant Examiner* — Luna Weissberger
(74) *Attorney, Agent, or Firm* — Arun Swain

(57) ABSTRACT

Various aspects of the present disclosure generally relate to wireless communication. In some aspects, a base station may receive, from a user equipment (UE), a measurement report associated with at least one downlink beam corresponding to a first transmit receive point (TRP). The base station may transmit, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP. Numerous other aspects are described.

30 Claims, 8 Drawing Sheets

BEAM INFERENCE FOR MULTIPLE TRANSMIT RECEIVE POINT COMMUNICATIONS

FIELD OF THE DISCLOSURE

Aspects of the present disclosure generally relate to wireless communication and to techniques and apparatuses for beam inference for multiple transmit receive point communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a base station for wireless communication includes a memory, and one or more processors, coupled to the memory, configured to: receive, from a user equipment (UE), a measurement report associated with at least one downlink beam corresponding to a first transmit receive point (TRP); and transmit, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP.

In some aspects, a UE for wireless communication includes a memory, and one or more processors, coupled to the memory, configured to: transmit, to a base station, a measurement report associated with at least one downlink beam corresponding to a first TRP; and receive, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP.

In some aspects, a method of wireless communication performed by a base station includes receiving, from a UE, a measurement report associated with at least one downlink beam corresponding to a first TRP; and transmitting, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP.

In some aspects, a method of wireless communication performed by a UE includes transmitting, to a base station, a measurement report associated with at least one downlink beam corresponding to a first TRP; and receiving, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP.

In some aspects, a non-transitory computer-readable medium storing a set of instructions for wireless communication includes one or more instructions that, when executed by one or more processors of a base station, cause the base station to: receive, from a UE, a measurement report associated with at least one downlink beam corresponding to a first TRP; and transmit, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP.

In some aspects, a non-transitory computer-readable medium storing a set of instructions for wireless communication includes one or more instructions that, when executed by one or more processors of a UE, cause the UE to: transmit, to a base station, a measurement report associated with at least one downlink beam corresponding to a first TRP; and receive, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP.

In some aspects, an apparatus for wireless communication includes means for receiving, from a UE, a measurement report associated with at least one downlink beam corresponding to a first TRP; and means for transmitting, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP.

In some aspects, an apparatus for wireless communication includes means for transmitting, to a base station, a measurement report associated with at least one downlink beam corresponding to a first TRP; and means for receiving, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
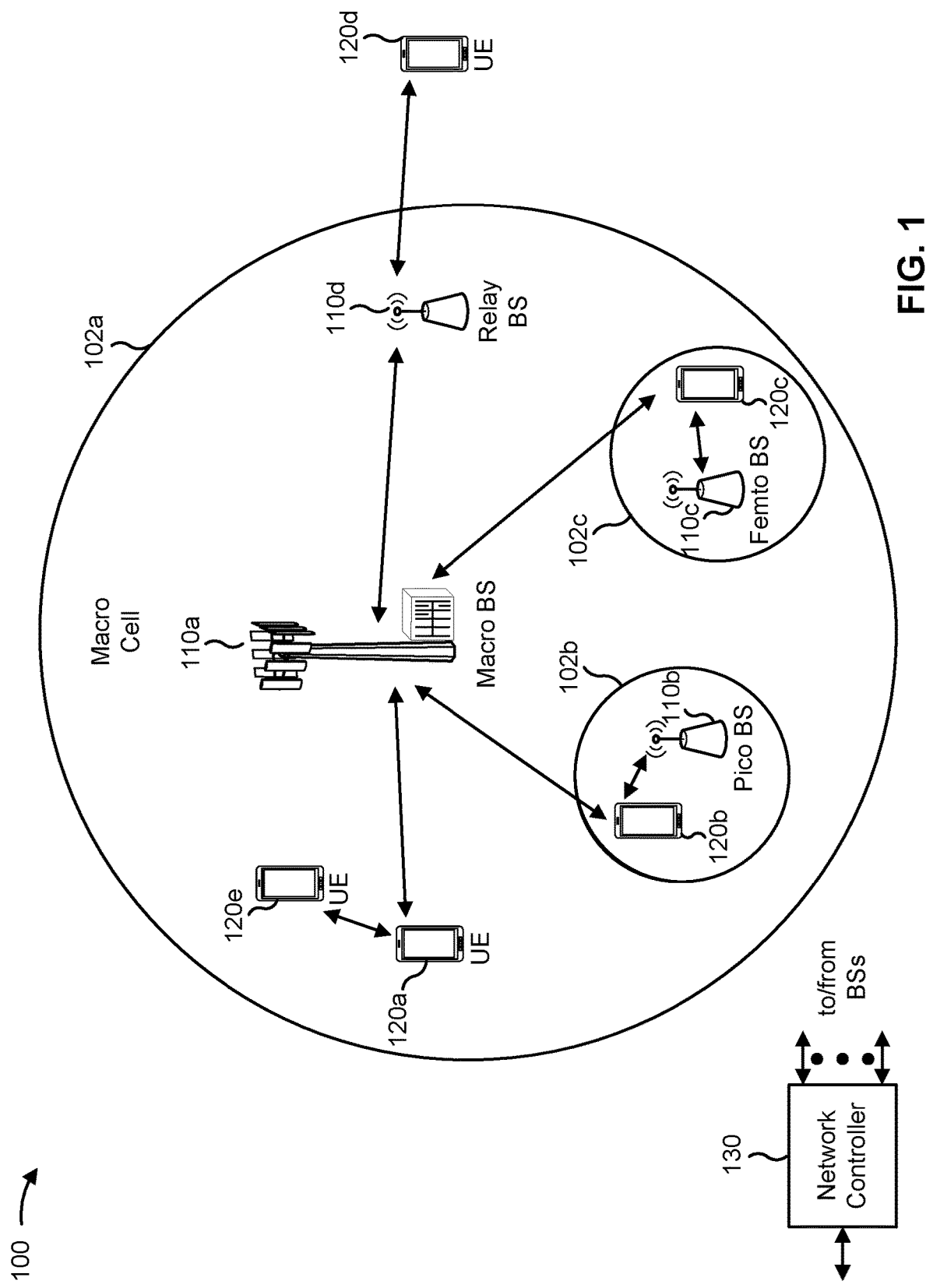
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
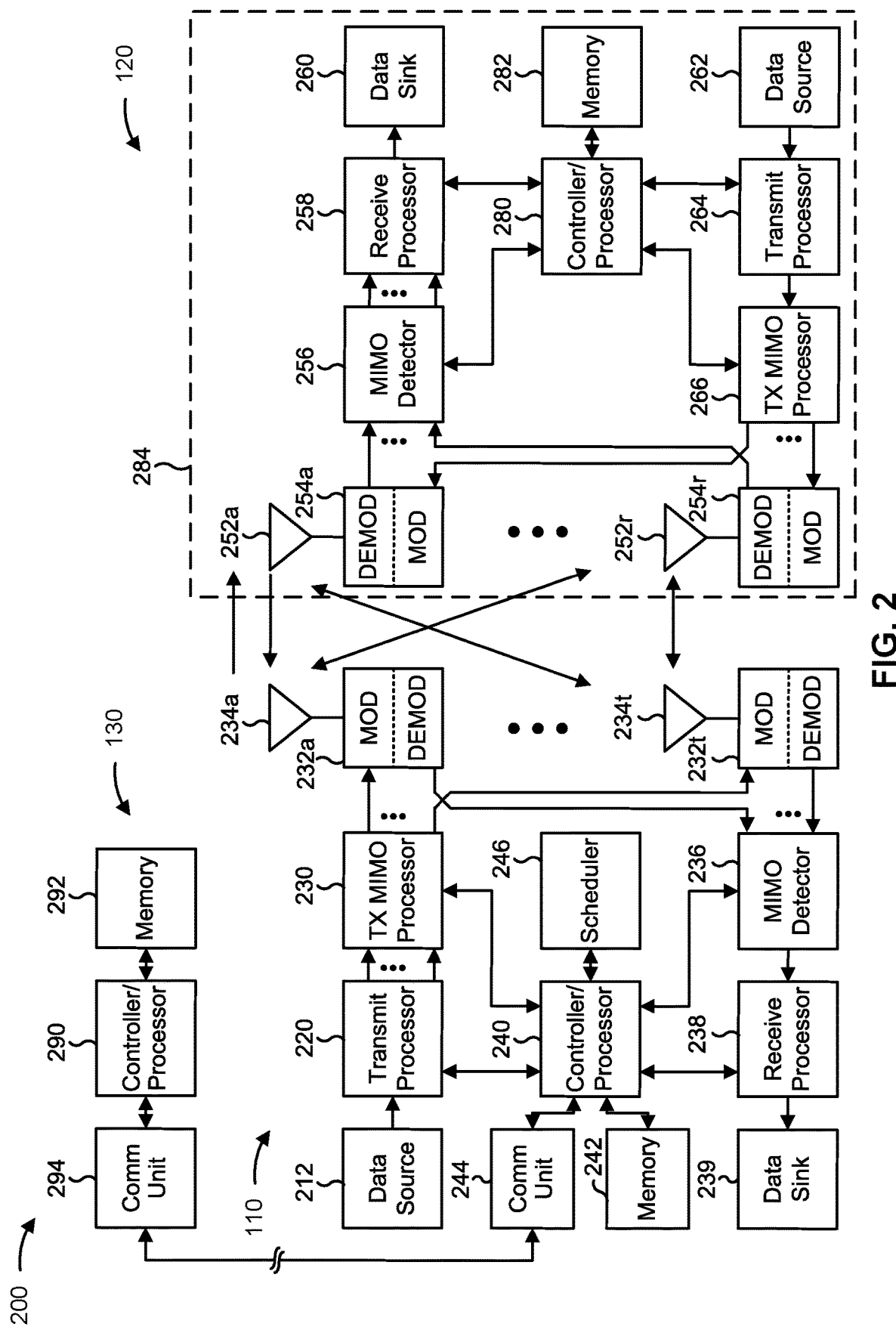
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern.

A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, and/or any other component(s) of FIG. 2 may perform one or more techniques associated with beam inference for multiple TRP communications, as described in more detail elsewhere herein. In some aspects, the TRP described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG.

6, and/or other processes as described herein. In some aspects, executing instructions may include running the instructions, converting the instructions, compiling the instructions, and/or interpreting the instructions, among other examples.

In some aspects, the base station includes means for receiving, from a UE, a measurement report associated with at least one downlink beam corresponding to a first TRP; and/or means for transmitting, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the UE includes means for transmitting, to a base station, a measurement report associated with at least one downlink beam corresponding to a first TRP; and/or means for receiving, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
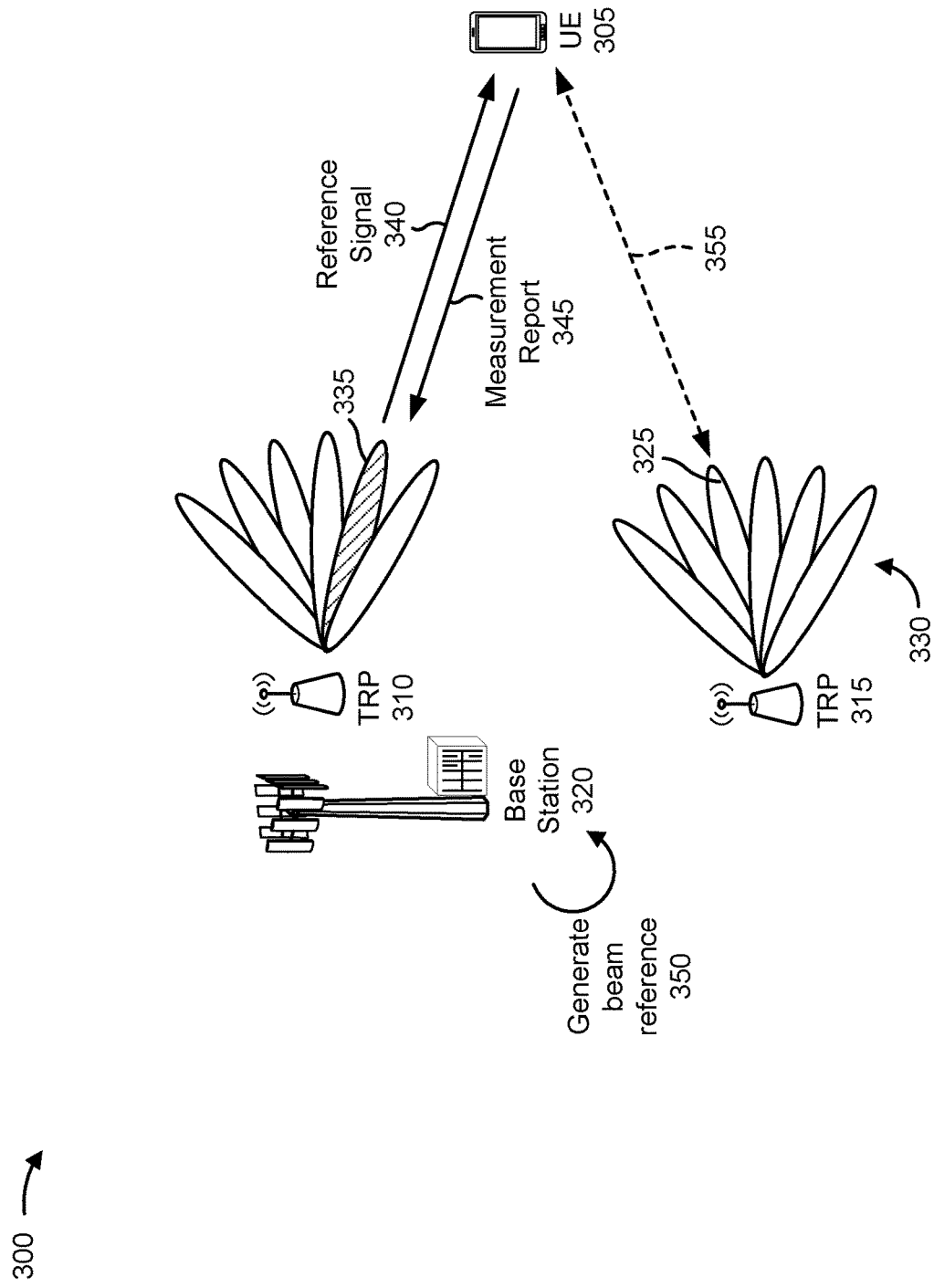
FIGS. 3 and 4 are diagrams illustrating examples associated with beam inference for multiple transmit receive point (TRP) communications, in accordance with the present disclosure.

FIG. 3 is a diagram illustrating an example 300 associated with beam inference for multiple TRP communications, in accordance with the present disclosure. As shown, a UE 305 may communicate with a TRP 310 and a TRP 315. The UE 305 may be, or be similar to, the UE 120 described above in connection with FIG. 1.

A TRP 310 and/or 315 may be a distributed unit (DU) of a distributed radio access network (RAN). In some aspects, a TRP 310 and/or 315 may correspond to a base station 320. The base station 320 may be, or be similar to, the base station 110 described above in connection with FIG. 1. For example, different TRPs 310 and/or 315 may be included in different base stations 320. Additionally, or alternatively, multiple TRPs 310 and/or 315 may be included in a single base station 320. In some cases, a TRP 310 and/or 315 may be referred to as a cell, a panel, an antenna array, or an array.

A TRP 310 and/or 315 may be connected to a single access node controller or to multiple access node controllers. In some aspects, a dynamic configuration of split logical functions may be present within an architecture of a distributed RAN. For example, a packet data convergence protocol (PDCP) layer, a radio link control (RLC) layer, and/or a medium access control (MAC) layer may be configured to terminate at an access node controller or at a TRP 310 and/or 315.

In some aspects, multiple TRPs 310 and/or 315 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different TCI states, different precoding parameters, and/or different beamforming parameters). In some aspects, a TCI state may be used to indicate one or more QCL relationships. A TRP 310 and/or 315 may be configured to individually (e.g., using dynamic selection) or jointly (e.g., using joint transmission with one or more other TRPs 310 and/or 315) serve traffic to the UE 305.

The multiple TRPs 310 and/or 315 may communicate with the same UE 305 in a coordinated manner (e.g., using coordinated multipoint transmissions) to improve reliability and/or increase throughput. The TRPs 310 and/or 315 may coordinate such communications via an interface between the TRPs 310 and/or 315 (e.g., a backhaul interface and/or an access node controller). The interface may have a smaller delay and/or higher capacity when the TRPs 310 and/or 315 are co-located at the same base station 110 (e.g., when the TRPs 310 and/or 315 are different antenna arrays or panels of the same base station 110), and may have a larger delay and/or lower capacity (as compared to co-location) when the TRPs 310 and/or 315 are located at different base stations 110. The different TRPs 310 and/or 315 may communicate with the UE 305 using different QCL relationships (e.g., different TCI states), different demodulation reference signal (DMRS) ports, and/or different layers (e.g., of a multi-layer communication).

In some cases, the UE 305 may transition from communication with the TRP 310 to communication with TRP 315. To identify a beam 325 of the TRP 315 to use for communication, the UE 305 may perform a beam management procedure. The beam management procedure may include, for example, a beam selection procedure, an initial beam acquisition procedure, a beam sweeping procedure, a cell search procedure, a beam search procedure, and/or a beam refinement procedure, among other examples. To facilitate the beam management procedure, the base station 320 may transmit one or more reference signals to the UE 305. The reference signals may include, for example, synchronization signal blocks (SSBs) and/or channel state information reference signals (CSI-RSs), among other examples.

The beam management procedure may include the TRP 315 performing beam sweeping over multiple transmit (Tx) beams 330. The TRP 315 may transmit a reference signal using each transmit beam for beam management. For each transmit beam of the TRP 315, the UE 305 may perform beam sweeping through the receive beams of the UE 305. As a result, the beam management procedure may enable the UEs 305 to measure a reference signal on different transmit beams using different receive beams to support selection and/or refinement of a TRP 315 transmit beam 325. The UE 305 may report the measurements to the base station 320 (e.g., via TRP 310 and/or TRP 315) to enable the base station 320 to select one or more beam pair(s) for communication between the TRP 315 and the UE 305.

In cases in which the UE 305 is not aware of any particular beam or beams of the transmit beams 330 of the TRP 315 that is or are more likely to be used, the UE 305 may scan all of the beams of the TRP 315 during a beam management procedure. For example, a UE may receive and attempt to decode all of the reference signals that can be received by the UE from the TRP 315. This may lead to unnecessary power consumption and processing consumption, thereby having a negative impact on UE performance. In some cases, for example, the reference signals may include SSBs and/or channel state information reference signals (CSI-RSs), among other examples. For example, the reference signals may include CSI-RSs when the UE 305 is in connected mode and may be used for beam refinement. In some cases, the base station 320 may be configured to transmit an on-demand reference signal via the TRP 315 to the UE 305, for example. In cases in which the UE 305 is unaware of the corresponding beams to sweep, the UE 305 may sweep all of the beams or a subset of all of the beams that includes beams unlikely to correspond to the on-demand reference signal, thereby leading to unnecessary power consumption and processing consumption, and having a negative impact on UE performance.

Some aspects of the techniques and apparatuses described herein may facilitate inference of a beam of a second TRP that will be used based at least in part on measurements associated with a beam of a first TRP and a location of the second TRP relative to the location of the first TRP. In this way, a UE can attempt to decode the reference signals that are associated with the inferred beam, as opposed to attempting to decode all of the reference signals. For example, as shown in FIG. 3, in some aspects, the base station 320 may transmit, via a beam 335 of TRP 310, a reference signal 340 to the UE 305. The UE 305 may transmit a measurement report 345 based at least in part on that reference signal 340. The base station 320 may use the measurement report 345 and a location of the TRP 315 relative to a location of the TRP 310 to generate a beam inference that indicates an inferred beam, as shown by reference number 350. As shown by reference number 355, the base station 320 may use the inferred beam to communicate with the UE 305. For example, the base station may request a measurement report from the UE 305 associated with the inferred beam. In this way, the UE 305 may decode only reference signals associated with the inferred beam. As a result, some aspects described herein may reduce processing power and processing time consumption, thereby having a positive impact on the performance of UEs.

As indicated above, FIG. 3 is provided as an example. Other examples may differ from what is described with regard to FIG. 3.

Figure 4:
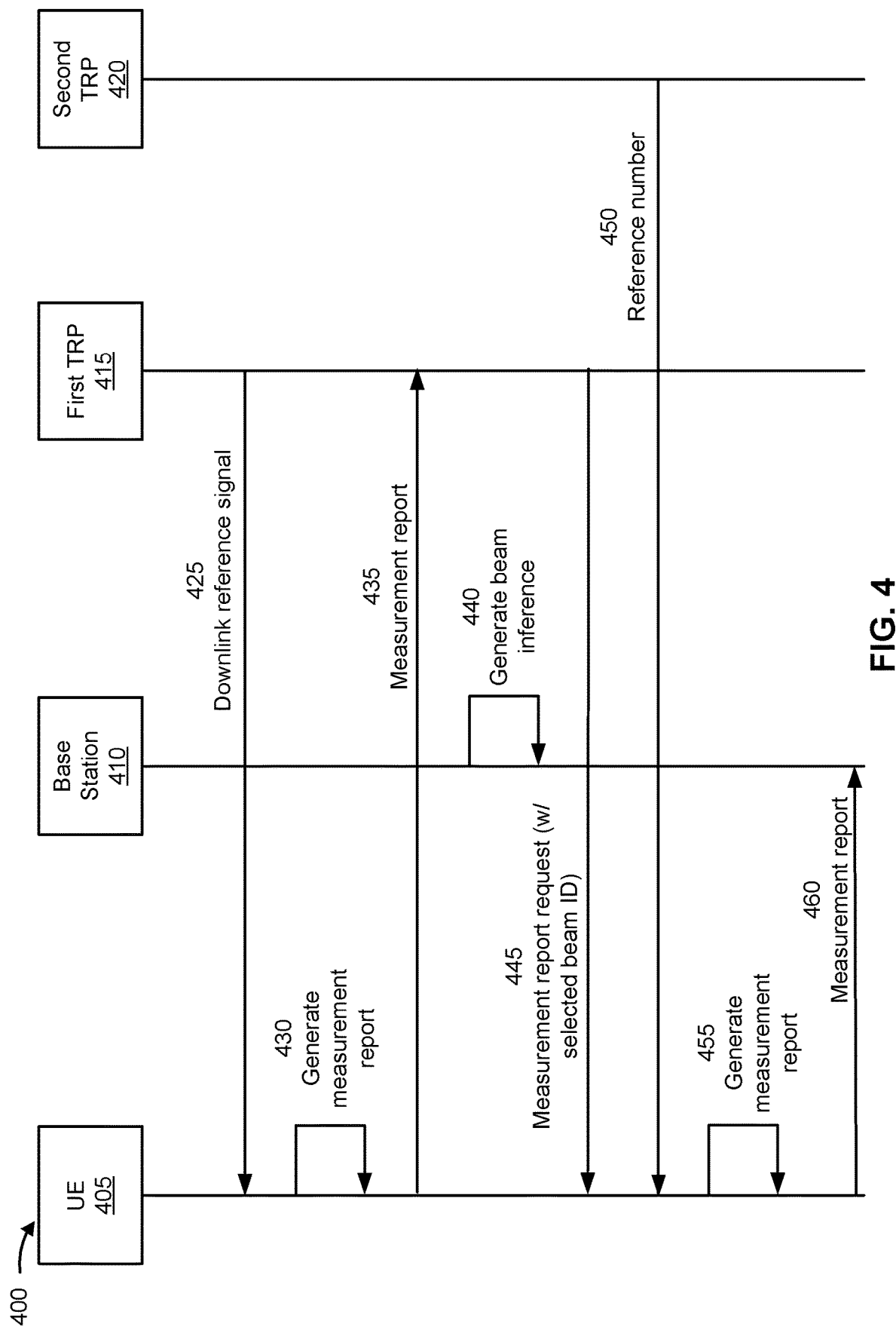

FIG. 4 is a diagram illustrating an example 400 associated with beam inference for multiple TRP communications, in accordance with the present disclosure. As shown in FIG. 4, a UE 405 may communicate with a base station 410, a first TRP 415, and a second TRP 420. The UE 405 may be, or be similar to, the UE 305 depicted in FIG. 3 and/or the UE 120 depicted in FIGS. 1 and 2. In some aspects, the base station 410 may be associated with at least one of the first TRP 415 or the second TRP 420. In some aspects, the base station 410 may be associated with one of the first TRP 415 or the second TRP 420, and an additional base station (not shown) may be associated with the other of the first TRP or the second TRP. The base station 410 may be, or be similar to, the base station 320 depicted in FIG. 3 and/or the base station 110 depicted in FIGS. 1 and 2. The first TRP 415 may be, or be similar to, the TRP 310 depicted in FIG. 3, and the second TRP 420 may be, or be similar to, the TRP 315 depicted in FIG. 4.

As shown by reference number 425, the first TRP 415 may transmit, and the UE 405 may receive, at least one downlink reference signal. The at least one downlink reference signal may include an SSB, a channel state information reference signal (CSI-RS), and/or a position location reference signal (PRS), among other examples. The reference signal may be transmitted using a first beam.

As shown by reference number 430, the UE 405 may generate a measurement report based at least in part on the reference signal. The measurement report may include channel quality measurements, channel power measurements, and/or interference measurements, among other examples. For example, the measurement report may include at least one measurement, and the at least one measurement may include a reference signal received power (RSRP) measurement, a signal to interference plus noise ratio (SINR) measurement, a channel quality information (CQI) measurement, a precoding matrix indicator (PMI), and/or a MIMO rank indicator (RI) that indicates a number of independent communication channels (e.g., spatial channels) that may be supported by the channel corresponding to the reference signal. As shown by reference number 435, the UE 405 may transmit, and the TRP 415 (and, thus, in some aspects, the base station 410) may receive, the measurement report.

As shown by reference number 440, the base station 410 may generate a beam inference. For example, the base station 410 may generate the beam inference based at least in part on the measurement report and a location of the second TRP relative to a location of the first TRP. In some aspects, the base station 410 may generate the beam inference based at least in part on predicting a plurality of candidate downlink beams and selecting a selected downlink beam from the plurality of candidate downlink beams. In some aspects, the base station 410 may use a machine learning component to generate the beam inference.

For example, in some aspects, the base station 410 may use the machine learning component to predict, based at least in part on the measurement report and the location of the second TRP relative to the location of the first TRP, a plurality of candidate downlink beams having one or more characteristics corresponding to an inferred downlink communication that satisfies a quality condition. The one or more characteristics of a candidate downlink beam may include one or more quality metrics associated with the candidate downlink beam. The quality condition may be one of a plurality of quality conditions that are to be satisfied by a downlink beam to be considered a candidate downlink beam. In some aspects, a quality condition may include, for example, a threshold quality metric associated with the downlink beam that corresponds to beam control, data throughput, power consumption, reliability, RSRP, SINR, CQI, PMI, and/or RI, among other examples. The base station 410 may select, from the plurality of candidate downlink beams, a beam that satisfies an additional quality metric, a beam that satisfies a spatial metric (e.g., a beam that corresponds to a location or predicted location of the UE 405 more closely than other beams of the plurality of candidate downlink beams), a beam that has an associated quality metric that has a value greater than values of quality metrics of other candidate downlink beams.

A machine learning component is a software component of a device (e.g., a client device, a server device, a UE, a base station, a TRP, etc.) that performs one or more machine learning procedures and/or that works with one or more other software and/or hardware components to perform one or more machine learning procedures. In one or more examples, a machine learning component may include, for example, software that may learn to perform a procedure without being explicitly trained to perform the procedure. A machine learning component may include, for example, a feature learning processing block (e.g., a software component that facilitates processing associated with feature learning) and/or a representation learning processing block (e.g., a software component that facilitates processing associated with representation learning). A machine learning component may include one or more neural networks, one or more classifiers, and/or one or more deep learning models, among other examples.

The base station 410 may train the machine learning component using at least one of an online training process while operating in a first operating mode or an offline training process while operating in a second operating mode. For example, the first operating mode may be a mode in which the base station 410 operates within a wireless network environment (e.g., a specified wireless network environment associated with the first operating mode), during a certain time range (e.g., during a specified time of day), and/or in accordance with specified operating parameters (e.g., transmission power, resource allocation configurations, and/or communication modes), among other examples. The second operating mode may be a mode in which the base station 410 operates outside of the wireless network environment (e.g., outside of the specified wireless network environment), during a certain time range (e.g., within the wireless network environment but during a time of day in which the base station 410 does not operate in accordance with the first operating mode), and/or in accordance with specified operating parameters (e.g., transmission power, resource allocation configurations, and/or communication modes, among other examples). In some aspects, the first operating mode may be referred to as a deployment mode and the second operating mode may be referred to as a training mode.

In some aspects, in an online training process, the base station 410 may train the machine learning component using the inputs used for determining the selected downlink beam and/or historical data associated with the operation of the machine learning process in a deployment phase. In some aspects, the base station 410 may use the inputs to reduce downlink beam training overhead associated with the second TRP rather than collecting similar data again for downlink beam training. In some aspects, in an offline training process, the base station 410 may train the machine learning component using historical data and/or computer-generated data while the machine learning component is not being used in a deployment phase to determine selected downlink beams as described herein. In some aspects, the base station 410 may use a combination of online and offline training.

As shown by reference number 445, the base station 410 may transmit a measurement report request that indicates the selected downlink beam. The measurement report request indicates a synchronization signal block associated with the selected downlink beam. As shown by reference number 450, the second TRP 420 may transmit, and the UE 405 may receive, a reference signal using the selected beam. As shown by reference number 455, the UE 405 may generate a measurement report based at least in part on the reference signal and, as shown by reference number 460, the UE 405 may transmit the measurement report to the base station (e.g., via the first TRP 415 and/or the second TRP 420). In some aspects, based at least in part on generating the beam inference, the base station 410 may communicate with UE 405 using the selected beam (e.g., before, after, in addition to, or in lieu of requesting a measurement report associated with the selected beam).

As indicated above, FIG. 4 is provided as an example. Other examples may differ from what is described with respect to FIG. 4.

Figure 5:
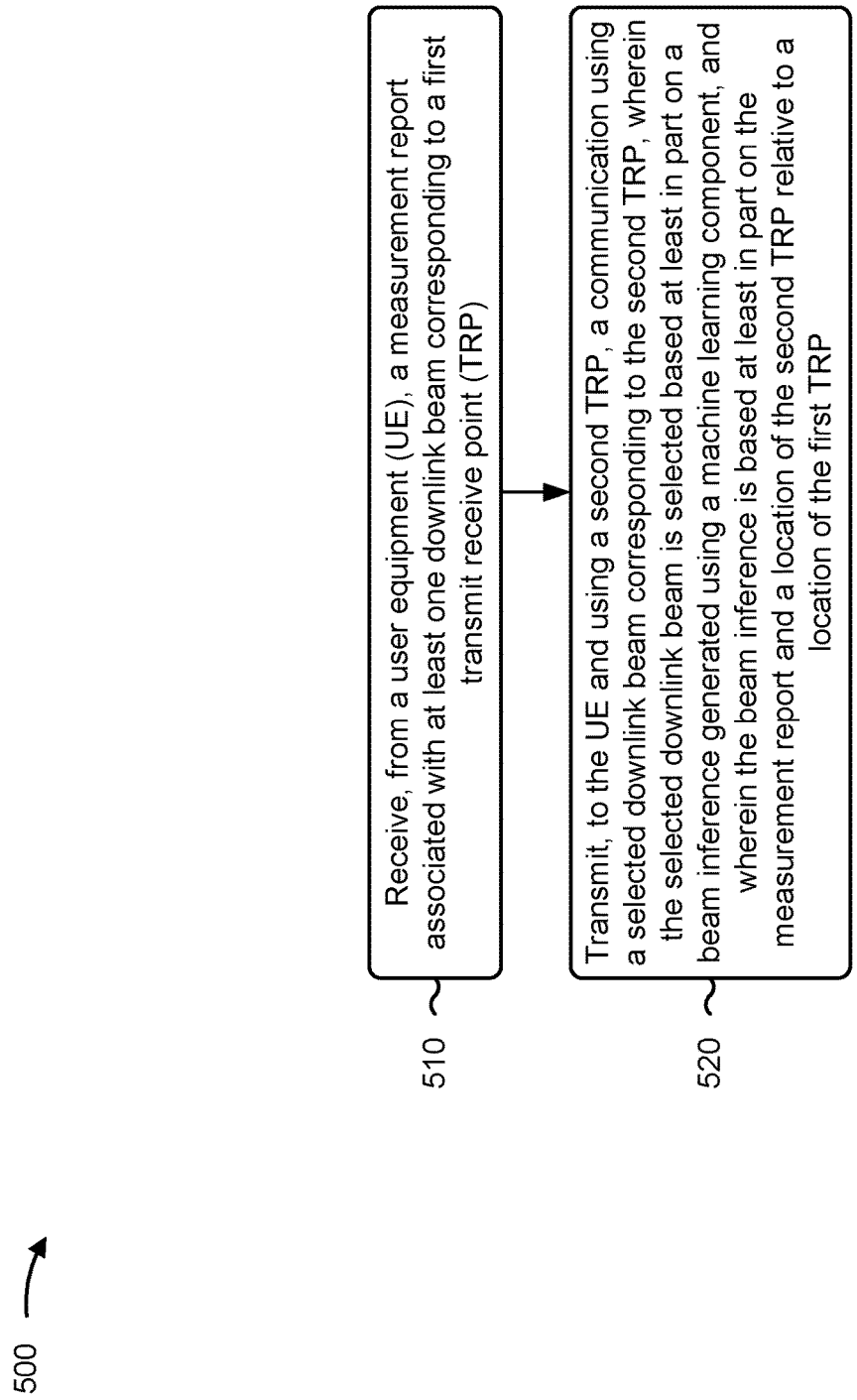
FIGS. 5 and 6 are diagrams illustrating example processes associated with beam inference for multiple TRP communications, in accordance with the present disclosure.

FIG. 5 is a diagram illustrating an example process 500 performed, for example, by a base station, in accordance with the present disclosure. Example process 500 is an example where the base station (e.g., base station 110, 320, and/or 410) performs operations associated with beam inference for multiple transmit receive point communications.

As shown in FIG. 5, in some aspects, process 500 may include receiving, from a UE, a measurement report associated with at least one downlink beam corresponding to a first TRP (block 510). For example, the base station (e.g., using reception component 702, depicted in FIG. 7) may receive, from a UE, a measurement report associated with at least one downlink beam corresponding to a first TRP, as described above.

As further shown in FIG. 5, in some aspects, process 500 may include transmitting, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP (block 520). For example, the base station (e.g., using transmission component 704, depicted in FIG. 7) may transmit, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP, as described above.

Process 500 may include additional aspects, such as any single aspect or any combination of aspects described below and/or in connection with one or more other processes described elsewhere herein.

In a first aspect, process 500 includes generating the beam inference using the machine learning component.

In a second aspect, alone or in combination with the first aspect, generating the beam inference comprises predicting a plurality of candidate downlink beams having one or more characteristics corresponding to an inferred downlink communication that satisfies a quality condition.

In a third aspect, alone or in combination with the second aspect, process 500 includes selecting the selected downlink beam from the plurality of candidate downlink beams.

In a fourth aspect, alone or in combination with one or more of the first through third aspects, the measurement report indicates at least one measurement associated with at least one downlink reference signal.

In a fifth aspect, alone or in combination with the fourth aspect, process 500 includes transmitting, using the first TRP, the at least one downlink reference signal.

In a sixth aspect, alone or in combination with one or more of the fourth through fifth aspects, the at least one downlink reference signal comprises at least one of an SSB, a CSI-RS, or a PRS.

In a seventh aspect, alone or in combination with one or more of the fourth through sixth aspects, the at least one measurement includes at least one of RSRP measurement, an SINR measurement, a CQI measurement, a PMI, or an RI.

In an eighth aspect, alone or in combination with one or more of the first through seventh aspects, process 500 includes transmitting a measurement report request that indicates the selected downlink beam.

In a ninth aspect, alone or in combination with the eighth aspect, the measurement report request indicates an SSB associated with the selected downlink beam.

In a tenth aspect, alone or in combination with one or more of the first through ninth aspects, process 500 includes training the machine learning component using at least one of an online training process while operating in a first operating mode or an offline training process while operating in a second operating mode.

In an eleventh aspect, alone or in combination with the tenth aspect, the machine learning component comprises a neural network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
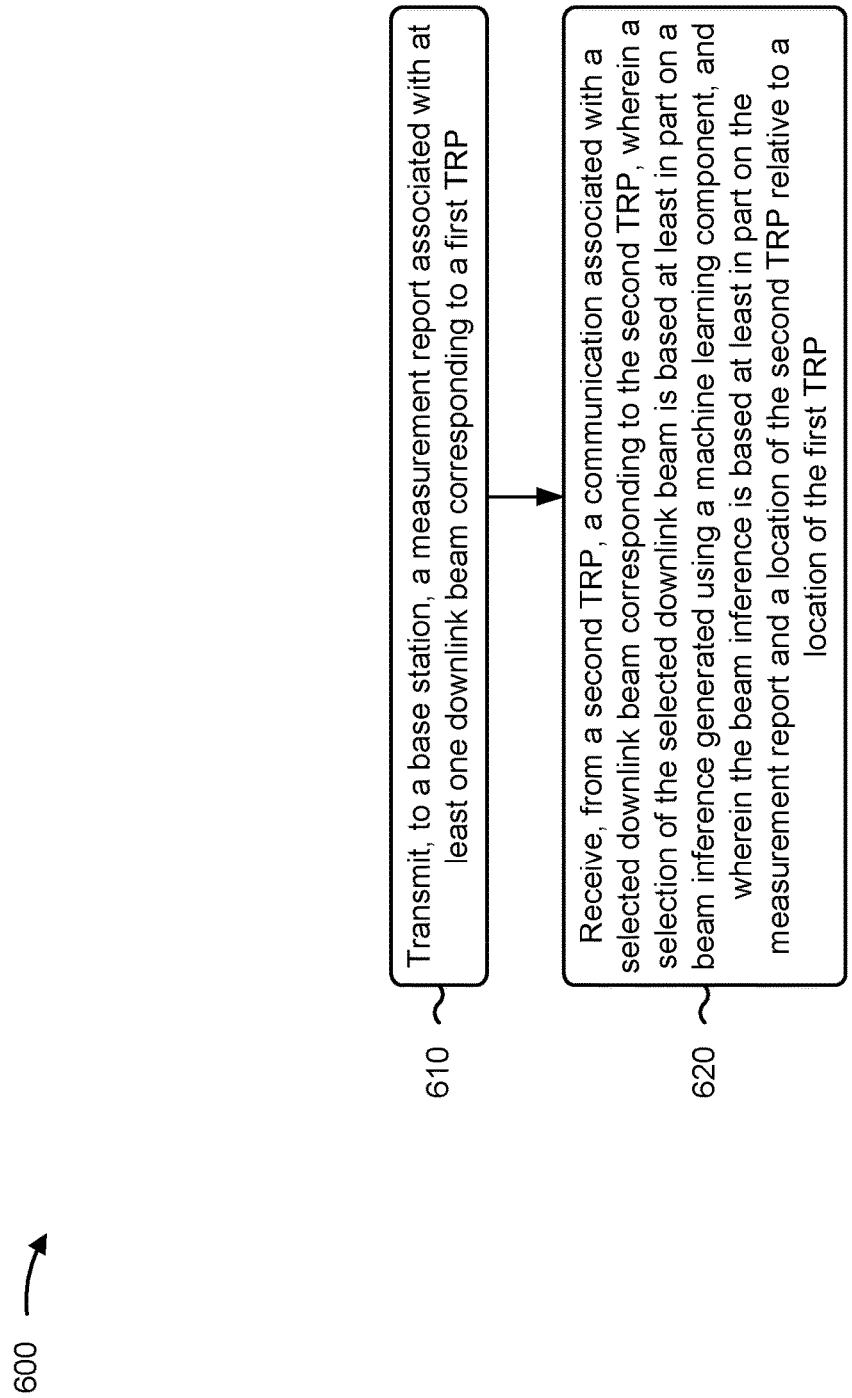

FIG. 6 is a diagram illustrating an example process 600 performed, for example, by a UE, in accordance with the present disclosure. Example process 600 is an example where the UE (e.g., UE 120, 305, and/or 405) performs operations associated with beam inference for multiple transmit receive.

As shown in FIG. 6, in some aspects, process 600 may include transmitting, to a base station, a measurement report associated with at least one downlink beam corresponding to a first TRP (block 610). For example, the UE (e.g., using transmission component 804, depicted in FIG. 8) may transmit, to a base station, a measurement report associated with at least one downlink beam corresponding to a first TRP, as described above.

As further shown in FIG. 6, in some aspects, process 600 may include receiving, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP (block 620). For example, the UE (e.g., using reception component 802, depicted in FIG. 8) may receive, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP, as described above.

Process 600 may include additional aspects, such as any single aspect or any combination of aspects described below and/or in connection with one or more other processes described elsewhere herein.

In a first aspect, the selected downlink beam was selected from a plurality of predicted candidate downlink beams having one or more characteristics corresponding to an inferred downlink communication that satisfies a quality condition.

In a second aspect, alone or in combination with the first aspect, the measurement report indicates at least one measurement associated with at least one downlink reference signal.

In a third aspect, alone or in combination with the second aspect, process 600 includes receiving, from the first TRP, the at least one downlink reference signal.

In a fourth aspect, alone or in combination with one or more of the second through third aspects, the at least one downlink reference signal comprises at least one of an SSB, a CSI-RS, or a PRS.

In a fifth aspect, alone or in combination with one or more of the second through fourth aspects, the at least one measurement includes at least one of an RSRP measurement, an SINR measurement, a CQI measurement, a PMI, or an RI.

In a sixth aspect, alone or in combination with one or more of the first through fifth aspects, process 600 includes receiving a measurement report request that indicates the selected downlink beam.

In a seventh aspect, alone or in combination with the sixth aspect, the measurement report request indicates an SSB associated with the selected downlink beam.

In an eighth aspect, alone or in combination with one or more of the first through seventh aspects, the machine learning component comprises a neural network.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
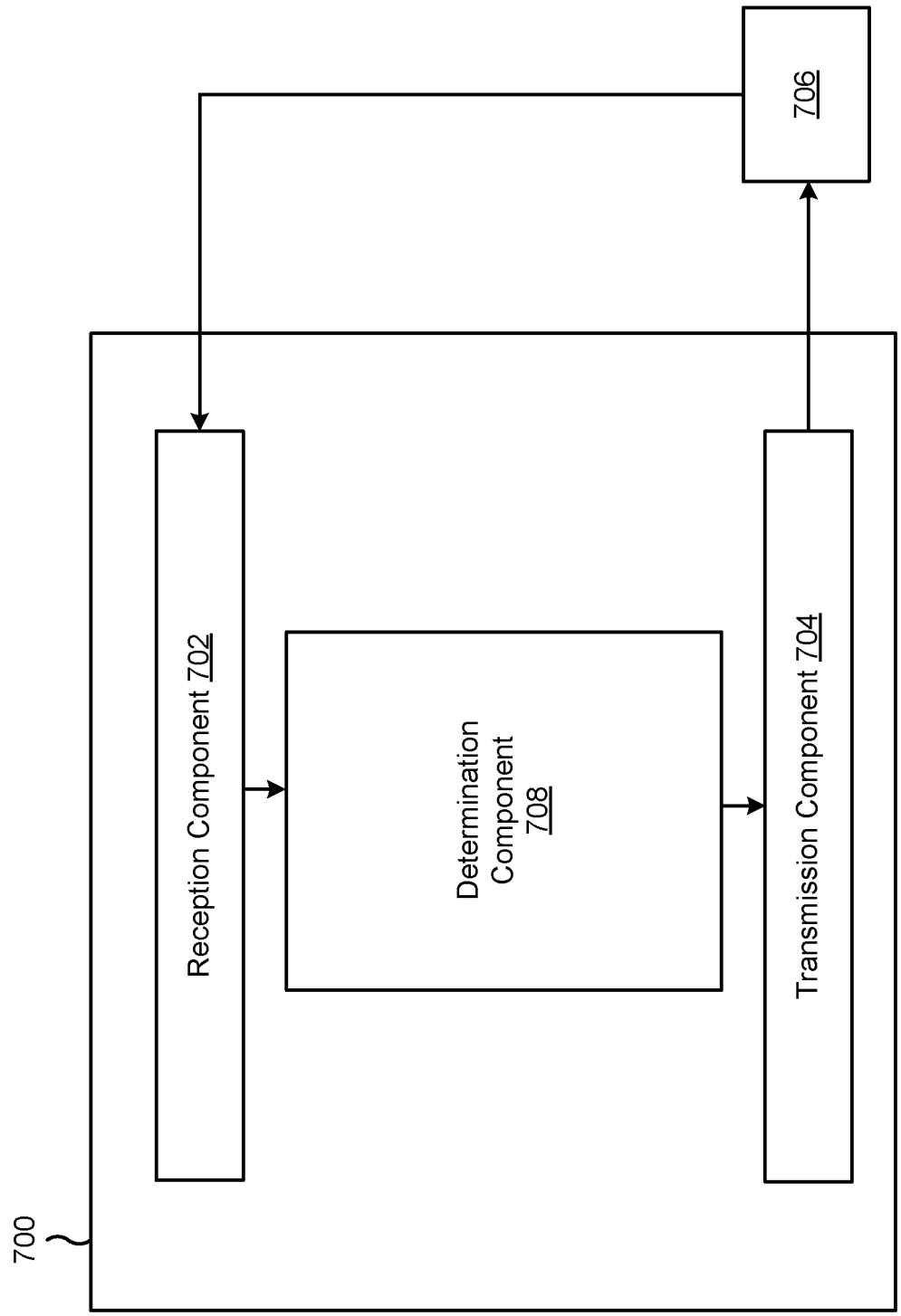
FIGS. 7 and 8 are block diagrams of example apparatuses for wireless communication, in accordance with the present disclosure.

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708.

In some aspects, the apparatus 700 may be configured to perform one or more operations described herein in connection with FIGS. 3 and 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The reception component 702 may receive, from a UE, a measurement report associated with at least one downlink beam corresponding to a first TRP. The transmission component 704 may transmit, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP. The transmission component 704 may transmit, using the first TRP, the at least one downlink reference signal. The transmission component 704 may transmit a measurement report request that indicates the selected downlink beam.

The determination component 708 may generate the beam inference using the machine learning component. The determination component 708 may select the selected downlink beam from a plurality of candidate downlink beams. The determination component 708 may train the machine learning component using at least one of an online training process while operating in a first operating mode or an offline training process while operating in a second operating mode. In some aspects, the determination component 708 may include one or more antennas, a modulator, a transmit MIMO processor, a transmit processor, a controller/processor, a memory, or a combination thereof, of the base station described above in connection with FIG. 2. In some aspects, the determination component 708 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
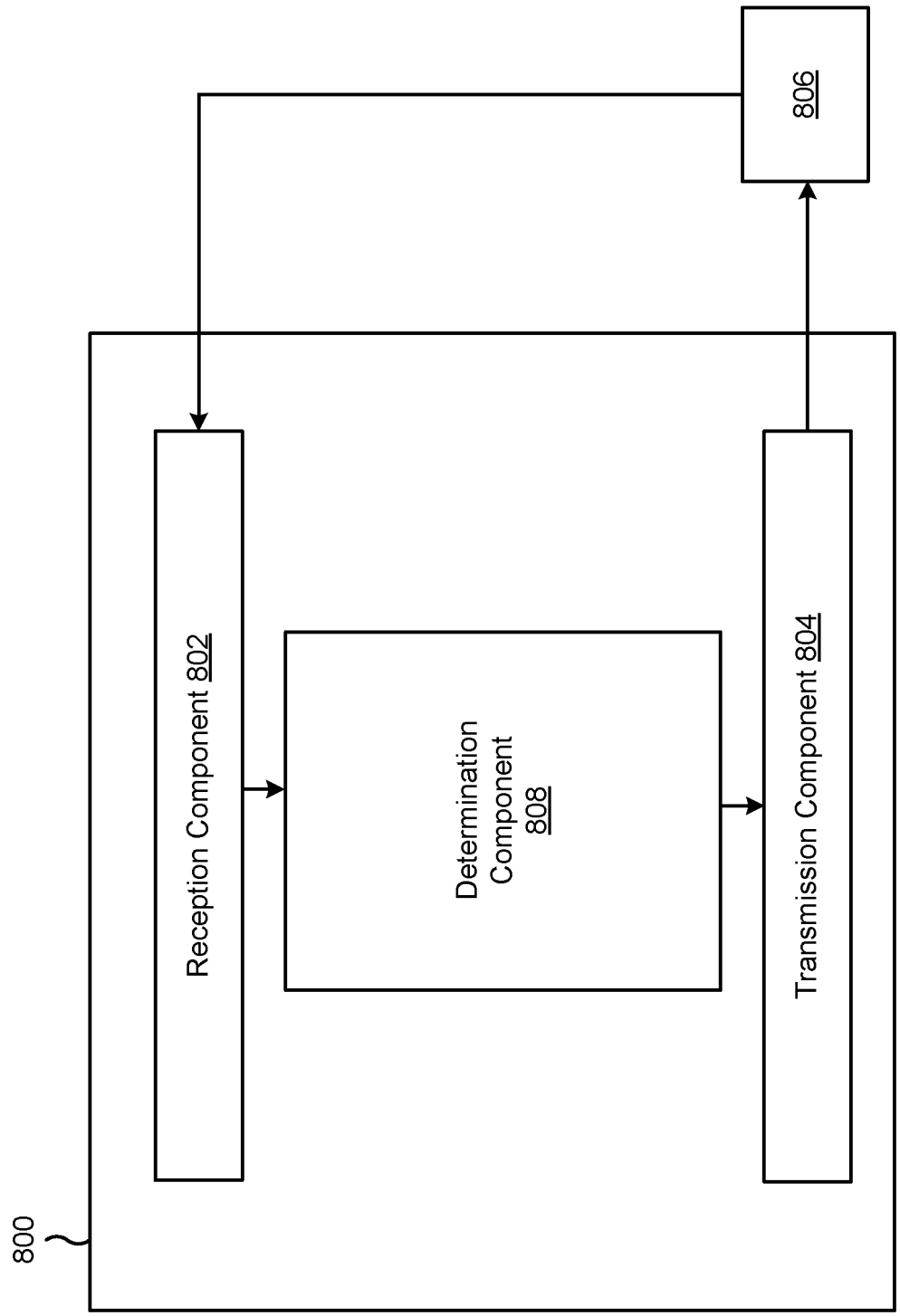

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIGS. 3 and 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit, to a base station, a measurement report associated with at least one downlink beam corresponding to a first TRP. The reception component 802 may receive, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP.

The reception component 802 may receive, from the first TRP, the at least one downlink reference signal. The reception component 802 may receive a measurement report request that indicates the selected downlink beam.

The determination component 808 may determine one or more measurements associated with a reference signal and/or generate a measurement report, among other examples. In some aspects, the determination component 808 may include one or more antennas, a modulator, a transmit MIMO processor, a transmit processor, a controller/processor, a memory, or a combination thereof, of the UE described above in connection with FIG. 2. In some aspects, the determination component 808 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a base station, comprising: receiving, from a user equipment (UE), a measurement report associated with at least one downlink beam corresponding to a first transmit receive point (TRP); and transmitting, to the UE and using a second TRP, a communication using a selected downlink beam corresponding to the second TRP, wherein the selected downlink beam is selected based at least in part on a beam inference generated using a machine learning component, and wherein the beam inference is based at least in part on the measurement report and a location of the second TRP relative to a location of the first TRP.

Aspect 2: The method of Aspect 1, further comprising generating the beam inference using the machine learning component.

Aspect 3: The method of Aspect 2, wherein generating the beam inference comprises predicting a plurality of candidate downlink beams having one or more characteristics corresponding to an inferred downlink communication that satisfies a quality condition.

Aspect 4: The method of Aspect 3, further comprising selecting the selected downlink beam from the plurality of candidate downlink beams.

Aspect 5: The method of any of Aspects 1-4, wherein the measurement report indicates at least one measurement associated with at least one downlink reference signal.

Aspect 6: The method of Aspect 5, further comprising transmitting, using the first TRP, the at least one downlink reference signal.

Aspect 7: The method of either of Aspects 5 or 6, wherein the at least one downlink reference signal comprises at least one of: a synchronization signal block, a channel state information reference signal, or a position location reference signal.

Aspect 8: The method of any of Aspects 5-7, wherein the at least one measurement includes at least one of: a reference signal received power measurement, a signal to interference plus noise ratio measurement, a channel quality information measurement, a precoding matrix indicator, or a rank indicator.

Aspect 9: The method of any of Aspects 1-8, further comprising transmitting a measurement report request that indicates the selected downlink beam.

Aspect 10: The method of Aspect 9, wherein the measurement report request indicates a synchronization signal block associated with the selected downlink beam.

Aspect 11: The method of any of Aspects 1-10, further comprising training the machine learning component using at least one of an online training process while operating in a first operating mode or an offline training process while operating in a second operating mode.

Aspect 12: The method of Aspect 11, wherein the machine learning component comprises a neural network.

Aspect 13: A method of wireless communication performed by a user equipment (UE), comprising: transmitting, to a base station, a measurement report associated with at least one downlink beam corresponding to a first transmit receive point (TRP); and receiving, from a second TRP, a communication associated with a selected downlink beam corresponding to the second TRP, wherein a selection of the selected downlink beam is based at least in part on a beam inference generated using a machine learning component, and wherein the beam inference is based at least in part on the measurement report and a location of the second TRP relative to a location of the first TRP.

Aspect 14: The method of Aspect 13, wherein the selected downlink beam was selected from a plurality of predicted candidate downlink beams having one or more characteristics corresponding to an inferred downlink communication that satisfies a quality condition.

Aspect 15: The method of either of Aspects 13 or 14, wherein the measurement report indicates at least one measurement associated with at least one downlink reference signal.

Aspect 16: The method of Aspect 15, further comprising receiving, from the first TRP, the at least one downlink reference signal.

Aspect 17: The method of either of Aspects 15 or 16, wherein the at least one downlink reference signal comprises at least one of: a synchronization signal block, a channel state information reference signal, or a position location reference signal.

Aspect 18: The method of any of Aspects 15-17, wherein the at least one measurement includes at least one of: a reference signal received power measurement, a signal to interference plus noise ratio measurement, a channel quality information measurement, a precoding matrix indicator, or a rank indicator.

Aspect 19: The method of any of Aspects 13-18, further comprising receiving a measurement report request that indicates the selected downlink beam.

Aspect 20: The method of Aspect 19, wherein the measurement report request indicates a synchronization signal block associated with the selected downlink beam.

Aspect 21: The method of any of Aspects 13-20, wherein the machine learning component comprises a neural network.

Aspect 22: An apparatus for wireless communication at a device, comprising a processor; memory coupled with the processor; and instructions stored in the memory and executable by the processor to cause the apparatus to perform the method of one or more Aspects of Aspects 1-12.

Aspect 23: A device for wireless communication, comprising a memory and one or more processors coupled to the memory, the memory and the one or more processors configured to perform the method of one or more Aspects of Aspects 1-12.

Aspect 24: An apparatus for wireless communication, comprising at least one means for performing the method of one or more Aspects of Aspects 1-12.

Aspect 25: A non-transitory computer-readable medium storing code for wireless communication, the code comprising instructions executable by a processor to perform the method of one or more Aspects of Aspects 1-12.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 27: An apparatus for wireless communication at a device, comprising a processor; memory coupled with the processor; and instructions stored in the memory and executable by the processor to cause the apparatus to perform the method of one or more Aspects of Aspects 13-21.

Aspect 28: A device for wireless communication, comprising a memory and one or more processors coupled to the memory, the memory and the one or more processors configured to perform the method of one or more Aspects of Aspects 13-21.

Aspect 29: An apparatus for wireless communication, comprising at least one means for performing the method of one or more Aspects of Aspects 13-21.

Aspect 30: A non-transitory computer-readable medium storing code for wireless communication, the code comprising instructions executable by a processor to perform the method of one or more Aspects of Aspects 13-21.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 13-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
a processing system that includes processor circuitry and memory circuitry that stores code, the processing system configured to cause the network entity to:
receive, from a user equipment (UE), a measurement report associated with at least a first downlink beam corresponding to a first transmit receive point (TRP);
select a second downlink beam, corresponding to a second TRP, to transition the UE to communication with the second TRP, in association with:
predicting a plurality of candidate downlink beams that each satisfy a plurality of quality metrics associated with a candidate downlink beam, the plurality of candidate downlink beams including the second downlink beam, and
selecting the second downlink beam, from the plurality of candidate downlink beams, in association with the second downlink beam satisfying an additional quality metric that is not included in the plurality of quality metrics; and
transmit, to the UE and via the second downlink beam, one or more reference signals in association with selecting the second downlink beam to transition the UE to communication with the second TRP.

2. The network entity of claim 1, wherein the processing system is further configured to select the second downlink beam using a machine learning component.

3. The network entity of claim 2, wherein each of the plurality of candidate downlink beams has one or more characteristics corresponding to an inferred downlink communication that satisfies the plurality of quality metrics.

4. The network entity of claim 1, wherein the measurement report indicates at least one measurement associated with at least one downlink reference signal.

5. The network entity of claim 4, wherein the processing system is further configured to transmit, using the first TRP, the at least one downlink reference signal.

6. The network entity of claim 4, wherein the at least one downlink reference signal comprises at least one of:
a synchronization signal block,
a channel state information reference signal, or
a position location reference signal.

7. The network entity of claim 4, wherein the at least one measurement includes at least one of:
a reference signal received power measurement,
a signal to interference plus noise ratio measurement,
a channel quality information measurement,
a precoding matrix indicator, or
a rank indicator.

8. The network entity of claim 1, wherein the processing system is further configured to transmit a measurement report request that indicates the second downlink beam.

9. The network entity of claim 8, wherein the measurement report request indicates a synchronization signal block associated with the second downlink beam.

10. The network entity of claim 1, wherein the processing system is further configured to train a machine learning component, for selecting the second downlink beam, using at least one of an online training process while operating in a first operating mode or an offline training process while operating in a second operating mode.

11. The network entity of claim 10, wherein the machine learning component comprises a neural network.

12. An apparatus for wireless communication at a user equipment (UE), comprising:
a processing system that includes processor circuitry and memory circuitry that stores code, the processing system configured to cause the apparatus to:
transmit, to a network entity, a measurement report associated with at least a first downlink beam corresponding to a first transmit receive point (TRP);
transition to communicating with a second TRP, via a second downlink beam corresponding to the second TRP, the second downlink beam being selected to transition to communicating with the second TRP in association with:
predicting a plurality of candidate downlink beams that each satisfy a plurality of quality metrics associated with a candidate downlink beam, the plurality of candidate downlink beams including the second downlink beam, and
selecting the second downlink beam, from the plurality of candidate downlink beams, in association with the second downlink beam satisfying an additional quality metric that is not included in the plurality of quality metrics; and
receive, from the second TRP and via the second downlink beam, one or more reference signals in association with transitioning to communicating with the second TRP via the second downlink beam.

13. The apparatus of claim 12, wherein each of the plurality of candidate downlink beams has one or more characteristics corresponding to an inferred downlink communication that satisfies the plurality of quality metrics.

14. The apparatus of claim 12, wherein the measurement report indicates at least one measurement associated with at least one downlink reference signal.

15. The apparatus of claim 14, wherein the processing system is further configured to receive, from the first TRP, the at least one downlink reference signal.

16. The apparatus of claim 14, wherein the at least one downlink reference signal comprises at least one of:
a synchronization signal block,
a channel state information reference signal, or
a position location reference signal.

17. The apparatus of claim 14, wherein the at least one measurement includes at least one of:
a reference signal received power measurement,
a signal to interference plus noise ratio measurement,
a channel quality information measurement,
a precoding matrix indicator, or
a rank indicator.

18. The apparatus of claim 12, wherein the processing system is further configured to receive a measurement report request that indicates the second downlink beam.

19. The apparatus of claim 18, wherein the measurement report request indicates a synchronization signal block associated with the second downlink beam.

20. The apparatus of claim 12, wherein a machine learning component for selecting the second downlink beam comprises a neural network.

21. A method of wireless communication performed at a network entity, comprising:
receiving, from a user equipment (UE), a measurement report associated with at least a first downlink beam corresponding to a first transmit receive point (TRP);
selecting a second downlink beam, corresponding to a second TRP, to transition the UE to communication with the second TRP, in association with:
predicting a plurality of candidate downlink beams that each satisfy a plurality of quality metrics associated with a candidate downlink beam, the plurality of candidate downlink beams including the second downlink beam, and selecting the second downlink beam, from the plurality of candidate downlink beams, in association with the second downlink beam satisfying an additional quality metric that is not included in the plurality of quality metrics; and transmitting, to the UE and via the second downlink beam, one or more reference signals in association with selecting the second downlink beam to transition the UE to communication with the second TRP.

22. The method of claim 21, further comprising selecting the second downlink beam using a machine learning component.

23. The method of claim 22, wherein each of the plurality of candidate downlink beams has one or more characteristics corresponding to an inferred downlink communication that satisfies the plurality of quality metrics.

24. The method of claim 21, wherein the measurement report indicates at least one measurement associated with at least one downlink reference signal.

25. The method of claim 24, further comprising transmitting, using the first TRP, the at least one downlink reference signal.

26. The method of claim 21, further comprising transmitting a measurement report request that indicates the second downlink beam.

27. The method of claim 26, wherein the measurement report request indicates a synchronization signal block associated with the second downlink beam.

28. A method of wireless communication performed at a user equipment (UE), comprising:

transmitting, to a network entity, a measurement report associated with at least a first downlink beam corresponding to a first transmit receive point (TRP);

transitioning to communicating with a second TRP, via a second downlink beam corresponding to the second TRP, the second downlink beam being selected to transition to communicating with the second TRP in association with:

predicting a plurality of candidate downlink beams that each satisfy a plurality of quality metrics associated with a candidate downlink beam, the plurality of candidate downlink beams including the second downlink beam, and selecting the second downlink beam, from the plurality of candidate downlink beams, in association with the second downlink beam satisfying an additional quality metric that is not included in the plurality of quality metrics; and receiving, from the second TRP and via the second downlink beam, one or more reference signals in association with transitioning to communicating with the second TRP via the second downlink beam.

29. The method of claim 28, wherein each of the plurality of candidate downlink beams has one or more characteristics corresponding to an inferred downlink communication that satisfies the plurality of quality metrics.

30. The method of claim 28, wherein the measurement report indicates at least one measurement associated with at least one downlink reference signal.

* * * * *